United States Patent Office 3,081,324
Patented Mar. 12, 1963

3,081,324
ORGANO MANGANESE COMPOUNDS AND METHOD OF MAKING SAME
Kestutis A. Keblys, West Lafayette, Ind., assignor to Ethyl Corporation, New York, N.Y., a corporation of Virginia
No Drawing. Filed Jan. 18, 1960, Ser. No. 2,825
19 Claims. (Cl. 260—429)

This invention relates to organic compounds of manganese, more particularly to such compounds in which a plurality of carbonyl groups is present. This invention further relates to methods of making and using these compounds.

Among the objects of the present invention is the provision of novel compounds of the above type which are simple to form and which have desirable uses.

The above as well as additional objects of the present invention will be more fully understood from the following description of several of its exemplifications.

The compounds of the present invention are organoyl manganese tetracarbonyl ammonias in which not more than two of the ammonia hydrogens are substituted by hydrocarbon radicals having up to 13 carbons each, and the organoyl radical has up to 13 carbon atoms.

These compounds are very conveniently formed by merely mixing a hydrocarbyl manganese pentacarbonyl with an ammonia corresponding to the one desired in the final compound. The hydrocarbyl manganese pentacarbonyls as well as methods for making them are described in U.S. Patent 2,913,413 granted November 17, 1959, and the pertinent disclosures of the preparation of these pentacarbonyls is incorporated herein as though fully set forth.

Although compounds of the present invention can have more than 13 carbons in any of the hydrocarbon radicals substituted for the ammonia hydrogen as well as in the organoyl radical, the use of more than 13 carbons in any one group is not preferred. The organoyl radicals can be of the acyl or aroyl types although those of the acyl type more readily form the desired compounds, and the compounds thus formed react more smoothly and efficiently.

The reaction that forms the compounds of the present invention takes place at room temperature as well as at temperatures as much as 70° above and below room temperature. In the interest of simplicity, it is best to operate at temperatures of from about −35 to 50° C. The manganese pentacarbonyls used as starting material for producing the desired compounds are generally low melting solids and they are more efficiently reacted by placing them in liquid form, as by dissolving them in a suitable solvent or by melting them. Suitable solvents are hydrocarbons such as gasoline, iso-octane, petroleum ether and n-decane, ethers such as tetrahydrofurane, diethyl ether, dipropyl ether, ethylene glycol monomethyl ether, ethylene glycol dimethyl ether, diethylene glycol monomethyl ether, diethylene glycol dimethyl ether, ethylene glycol diethyl ether, diethylene glycol monoethyl ether, diethylene glycol dibutyl ether, ethanol, propanol, butanol, acetone, methylethyl ketone and methyl isobutyl ketone. In general, all normally liquid hydrocarbons and normally liquid ethers and alcohols are effective for this purpose.

The reaction of the ammonia with the hydrocarbyl manganese pentacarbonyl generally takes at least about ½ hour to go to completion. As a matter of precaution the reaction can be continued for as much as 20 hours or more to assure good yields in the event one of the reactants is in the solid phase, or contaminants slow down the reaction velocity. The following examples, where all parts are parts by weight unless otherwise specified, show some of the variations in the reaction technique:

EXAMPLE I

*Cyclohexylamine Acetylmanganese Tetracarbonyl*

Methylmanganese pentacarbonyl (2.1 g., 0.010 mole) and cyclohexylamine (1.48 g., 0.015 mole) was dissolved in 70 ml. of tetrahydrofuran. The solution was stirred in a nitrogen atmosphere at room temperature for 4 hours. No gas evolution was observed. The reaction mixture was poured into 750 ml. of ice water and the resulting yellow precipitate (2.9 g., 93 percent) was filtered off, washed with water and dried. The product, recrystallized from ether, melting at 97.0–97.5° C. with gas evolution. It was soluble in carbon tetrachloride, chloroform and benzene, and sparingly soluble in iso-octane and methanol. The infrared spectrum (carbon tetrachloride solution) showed bands at $4.8\mu$, $4.95\mu$, $5.05\mu$, and $5.15\mu$ in the metallo-carbonyl region and a ketonic carbonyl band at $6.2\mu$. Its molecular weight was determined cryoscopically, and it was subjected to elemental analysis, with the following results:

Calculated for $C_{12}H_{16}MnNO_5$: C, 46.6; H, 5.21; Mn, 17.8; N, 4.53; mol. wt., 309. Found: C, 46.6; H, 5.37; Mn, 17.9; N, 4.23; mol. wt., 295.

EXAMPLE II

*Ammonia Acetylmanganese Tetracarbonyl*

A mixture of methylmanganese pentacarbonyl (4.0 g., 0.019 mole) and liquid ammonia (200 ml.) was refluxed with stirring for 2 hours. Excess ammonia was allowed to evaporate slowly. A greenish-yellow solid (4.11 g., 95 percent) remained in the reaction vessel. Recrystallization from diethyl ether gave 3.65 g. of ammonia acetylmanganese tetracarbonyl, light yellow crystals, melting at 95.5–96.0° C. with decomposition.

*Analysis.*—Calculated for $C_6H_8MnNO_5$: C, 31.8; H, 2.69; Mn, 24.2; N, 6.17. Found: C, 32.4; H, 2.70; Mn, 24.4; N, 6.16.

EXAMPLE III

*N-Methylcyclohexylamine Acetylmanganese Tetracarbonyl*

Methylmanganese pentacarbonyl (5.0 g., 0.024 mole) and N-methylcyclohexylamine (4.0 g., 0.036 mole) were dissolved in 50 ml. of tetrahydrofuran and stirred at room temperature for 2 hours. Excess solvent was evaporated in vacuo. The residues were cooled in Dry Ice giving 3.1 g. (40%) of yellow crystals. The product, recrystallized from petroleum ether (B.P. 38–42° C.), melted at 73–74° C.

*Analysis.*—Calculated for $C_{13}H_{18}MnNO_5$: C, 48.3; H, 5.60; Mn, 17.0; N, 4.33. Found: C, 48.3; H, 5.58; Mn, 17.4; N, 4.44.

EXAMPLE IV

*Aniline Acetylmanganese Tetracarbonyl*

Methylmanganese pentacarbonyl (3.0 g., 0.014 mole) and aniline (2.0 g., 0.022 mole) were dissolved in 50 ml. of tetrahydrofuran and kept under nitrogen at room temperature for 75 hours. Then the solution was poured into 400 ml. of ice water, giving a yellow precipitate, which after washing and drying weighed 1.72 g. (38%). Recrystallization from ether gave yellow crystals, melting at 83–84° C.

*Analysis.*—Calculated for $C_{12}H_{10}MnNO_5$: C, 47.6; H, 33.3; Mn, 18.1; N, 4.62. Found: C, 46.6; H, 33.3; Mn, 17.8; N, 4.70.

EXAMPLE V

*Cyclohexylamine Benzoylmanganese Tetracarbonyl*

Phenylmanganese pentacarbonyl (2.0 g., 0.0074 mole) and cyclohexylamine (0.80 g., 0.0081 mole) were dissolved in 35 ml. of diethyl ether and stirred at room temperature for 1.5 hours. The resulting orange solution was cooled in Dry Ice giving 0.25 g. (12% recovery) of phenylmanganese pentacarbonyl. The mother liquor was concentrated, cooled in Dry Ice and filtered, giving 0.87 g. of an orange, heterogeneous, solid mass and an orange-brown viscous filtrate. The filtrate was dried over potassium hydroxide pellets and paraffin flakes, giving 0.70 g. of a tacky, brown solid. Repeated extraction of this with petroleum ether, concentration of extracts, and cooling gave 0.23 g. (10% yield) of crude cyclohexylamine benzoylmanganese tetracarbonyl. Recrystallization from petroleum ether gave a yellow solid, melting at 75–78° C.

EXAMPLE VI

*Aniline Benozylmanganese Tetracarbonyl*

Phenylmanganese pentacarbonyl (2.72 g., 0.010 mole) and aniline (1.02 g., 0.011 mole) were dissolved in 30 ml. of ether and allowed to stand at room temperature under nitrogen for 163 hours. The resulting yellow-brown solution was filtered and cooled in Dry Ice giving 0.83 g. of yellow crystals. Fractional crystallization from petroleum ether gave 0.22 g. of benzoylmanganese pentacarbonyl and 0.61 g. of starting material. The mother liquor was concentrated and cooled giving 0.50 g. of starting material (total recovery of 41%). After further concentration the mother liquor was treated with iso-octane precipitating a dark yellow solid (0.23 g., 10%). The crude product melted at 78–79° C.

By way of comparison neither trimethylamine nor pyridine could be made to react with the hydrocarbyl manganese pentacarbonyls to form the desired products.

The above formation reactions do not require the presence of any materials other than the reactants, and no special treatment is needed as long as these reactants are caused to contact each other. After about ½ hour of such contact even at temperatures as low as −40° C., a recoverable yield of product is obtained. Reaction temperatures above 100° C. are not desirable because the desired products tend to decompose at these temperatures, patricularly when in concentrated form. These products are generally low melting crystalline solids with fairly strong color, very slightly soluble in petroleum ether, cold iso-octane and cold methanol when the ammonias range up to di-tridecyl amine, omega-phenyl amylamine, 4-hexyl-cyclohexyl amine and beta-heptyl piperidine. Other ammonias that are suitable for the purposes of the present invention include methylamine, ethylamine, dipropylamine, cyclopentylamine, amino cyclohexadiene-2,4, allyl amine, naphthylamine, N-tetrahydroquinoline, and pyrimidine. Ammonia itself and aliphatic-substituted ammonias react most rapidly to form the desired compounds.

The hydrocarbyl groups in the original manganese pentacarbonyl can range up to 12 carbons in size and preferably are alkyl groups inasmuch as the yields are much lower with aryl groups. Good results can be obtained with hydrocarbyl groups such as phenyl, toluyl, xylyl, dodecyl, para-dicyclohexyl, hexyl pentyl, butyl and vinyl. As a result of the reaction, the hydrocarbyl groups have a carbonyl group added and are accordingly converted to hydrocarboyl groups with one additional carbon.

The hydrocarboyl manganese tetracarbonyl ammonias of the present invention are cleaved by strong alkali such as sodium methylate to split off the hydrocarboyl portion from the balance of the molecule. The methylate of the hydrocarboyl group is thus formed, corresponding to the methyl ester of the carboxylic acid that has an OH group connected to the hydrocarboyl group. With other alcoholates, the corresponding other esters of the same acid are formed. With sodium hydroxide the unesterified acid is formed.

The remainder of the split molecule appears to be an ammonia complex $NaMn(CO)_4 \cdot$ammonia. When treated with methyl iodide this remainder disproportionates to give methyl manganese pentacarbonyl along with bis-ammonia iodomanganese tricarbonyl.

The above cleavage reactions establish the structure of the original hydrocarboyl manganese tetracarbonyl ammonias and show that in the formation of these compounds one of the carbonyl groups of the pentacarbonyl reatcant becomes linked to the hydrocarbyl radical. This shift is reversed in the presence of strong acid, and the hydrocarbyl manganese pentacarbonyl thus recovered along with the corresponding salt of the amine. Both their cleavage and the reversal of their formation reactions provide valuable uses for the compounds of the present invention.

The cleavage provides one simple technique for the direct formation of esters from hydrocarbon halides or sulfates. These starting materials readily react with $NaMn(CO)_5$, as shown in Examples XXX and XXXI of U.S. Patent 2,913,413, to give the hydrocarboyl manganese pentacarbonyl used as a reactant to form a hydrocarboyl ammonia of the present invention. Although that Example XXXI describes the reaction of a hydrocarboyl halide with the above sodium compound, hydrocarbyl halides react in the same way although less vigorously. The hydrocarboyl ammonia can then be cleaved with or without prior purification, to form the desired ester. Any other alkali metal salt of a hydroxy hydrocarbon can be used in the cleavage, as for instance sodium ethylate, lithium beta phenyl ethylate, potassium cyclohexylate, rubidium octadecylate, etc. The following is a typical cleavage run:

EXAMPLE VII

*Cleavage of Cyclohexylamine Acetylamanganese Tetracarbonyl With Sodium Methoxide*

To the cyclohexyalmine acetyl manganese tetracarbonyl of Example I (10.0 g., 0.032 mole) dissolved in 300 ml. of methanol there was added dropwise a solution of sodium methoxide (1.75 g., 0.032 mole) with ice cooling. After the addition the solution was stirred at room temperature for 2.5 hours. Approximately 100 ml. of solvent was distilled off and the fraction boiling in the range of 53.2–63.9° C. was identical to an authentic methanol-methylacetate azeotrope. Refractive index data showed that the product contained 1.6 g. of methylacetate (69% of theory).

Twelve milliliters of the azeotrope was refluxed with 4 ml. of benzylamine and 0.1 g. of ammonium chloride for 42 hours. Methanol was then distilled off, and the residue neutralized with aqueous HCl. Ether extraction and evaporation gave white crystals which melted at 63–64° C. after recrystallization from n-hexane-ether. No melting point depression was observed with an authentic sample of N-benzylacetamide.

The ammonia fraction of the cleavage remained in the reaction mixture after the first distillation and was treated with methyl iodide (13.6 g., 0.096 mole) and stirred at room temperature for 2.5 hours. The solvent was evaporated in vacuo, leaving 60 ml. of a brown solution. Methyl manganese pentacarbonyl (0.48 g.) sublimed out of the reaction mixture during the evaporation. Yellow-brown flakes of bis-cyclohexylamine iodomanganese tricarbonyl crystallized out of the brown solution after standing overnight. After recrystallization from chloroform the solid melted at 192.0–192.5° C. with decomposition.

*Analysis.*—Calculated for $C_{15}H_{26}IMnN_2O_3$: C, 38.8; H, 5.65; I, 27.4; Mn, 11.9; N, 6.04. Found: C, 39.3; H, 5.89; I, 27.9; Mn, 11.6; N, 6.03.

Similar cleavages produce hexadecyl octanoate, 4-phenyl cyclohexyl benzoate, beta naphthyl heptanoate. By selecting non-azeotropic cleavage solvents or even using non-azeotropic diluents that are not solvents for the cleavage reactants, the distillation of the ester is simplified.

The hydrocarboyl manganese tetracarbonyl ammonias of the present invention are also good gasoline additives since they produce effective octane rating increases notwithstanding their low solubility in the gasoline. At a concentration of 1 pound per thousand barrels aniline acetylmanganese tetracarbonyl will by way of example substantially raise the octane rating of unleaded 100 octane gasoline, and will also produce a substantial increase in the octane rating of gasoline containing 3 cc. of tetraethyllead per gallon and having an octane rating of 96.

In the formation of the hydrocarboyl manganese tetracarbonyl ammonias it is not necessary to use a nitrogen atmosphere. The reaction atmosphere can be ordinary air without changing the results.

Obviously many modifications and variations of the present invention are possible in the light of the above teachings. It is therefore to be understood that, within the scope of the appended claims, the invention may be practiced otherwise than as specifically described.

What is claimed is:

1. Compounds selected from the class consisting of hydrocarboyl manganese tetracarbonyl ammonia compounds, hydrocarboyl manganese tetracarbonyl primary amine compounds, and hydrocarboyl manganese tetracarbonyl secondary amine compounds wherein the hydrocarboyl radical is an acyl radical having up to about 13 carbon atoms derived from a carboxylic acid, and is selected from the class consisting of alkylcarbonyl, cycloalkylcarbonyl, alkarylcarbonyl, arylcarbonyl, and aralkylcarbonyl radicals; and wherein the organic radicals in the primary and secondary amine portions of the hydrocarboyl manganese tetracarbonyl primary and secondary amine compounds are hydrocarbon radicals having up to about 13 carbon atoms and are selected from the class consisting of alkyl, cycloalkyl, cycloalkenyl, alkenyl, aryl and aralkyl radicals.

2. The compounds of claim 1 wherein the hydrocarboyl radical is an alkylcarbonyl radical.

3. The hydrocarboyl manganese tetracarbonyl ammonia compounds of claim 1.

4. Ammonia acetylmanganese tetracarbonyl.

5. The hydrocarboyl manganese tetracarbonyl primary amine compounds of claim 1 wherein the primary amine is cyclohexyl amine.

6. Cyclohexylamine acetylmanganese tetracarbonyl.

7. Cyclohexylamine benzoylmanganese tetracarbonyl.

8. The hydrocarboyl manganese tetracarbonyl primary amine compounds of claim 1 wherein the primary amine is aniline.

9. Aniline benzoylmanganese tetracarbonyl.

10. Aniline acetylmanganese tetracarbonyl.

11. The hydrocarboyl manganese tetracarbonyl secondary amine compounds of claim 1 wherein the secondary amine is N-methyl cyclohexylamine.

12. N-methylcyclohexylamine acetylmanganese tetracarbonyl.

13. Process for the preparation of the compounds of claim 1, said process comprising reacting a compound selected from the class consisting of ammonia and primary and secondary amines, wherein the organic radicals of said primary and secondary amines are hydrocarbon radicals having up to about 13 carbon atoms and are selected from the class consisting of alkyl, cycloalkyl, cycloalkenyl, aryl, alkenyl and aralkyl radicals; with a hydrocarbyl manganese pentacarbonyl in which the hydrocarbyl radical corresponds to the desired hydrocarboyl radical without its carbonyl moiety.

14. Process for the preparation of cyclohexylamine acetylmanganese tetracarbonyl, said process comprising reacting methyl manganese pentacarbonyl with cyclohexylamine.

15. Process for the preparation of ammonia acetylmanganese tetracarbonyl, said process comprising reacting ammonia with methyl manganese pentacarbonyl.

16. Process for the formation of N-methyl cyclohexylamine acetylmanganese tetracarbonyl, said process comprising reacting methylmanganese pentacarbonyl with N-methyl cyclohexylamine.

17. Process for the preparation of aniline benzoyl manganese tetracarbonyl, said process comprising reacting phenylmanganese pentacarbonyl with aniline.

18. Process for the preparation of cyclohexylamine benzoyl manganese tetracarbonyl, said process comprising reacting phenylmanganese pentacarbonyl with cyclohexylamine.

19. Process for the formation of aniline acetylmanganese tetracarbonyl, said process comprising reacting methylmanganese pentacarbonyl with aniline.

References Cited in the file of this patent

UNITED STATES PATENTS

| | | |
|---|---|---|
| 1,459,971 | Carter et al. | June 26, 1923 |
| 2,398,157 | Ramage | Apr. 9, 1946 |
| 2,818,416 | Brown et al. | Dec. 31, 1957 |
| 2,913,413 | Brown | Nov. 17, 1959 |
| 2,927,935 | Coffield et al. | Mar. 8, 1960 |
| 2,930,807 | Case | Mar. 29, 1960 |

FOREIGN PATENTS

| | | |
|---|---|---|
| 1,201,531 | France | July 15, 1959 |